UNITED STATES PATENT OFFICE.

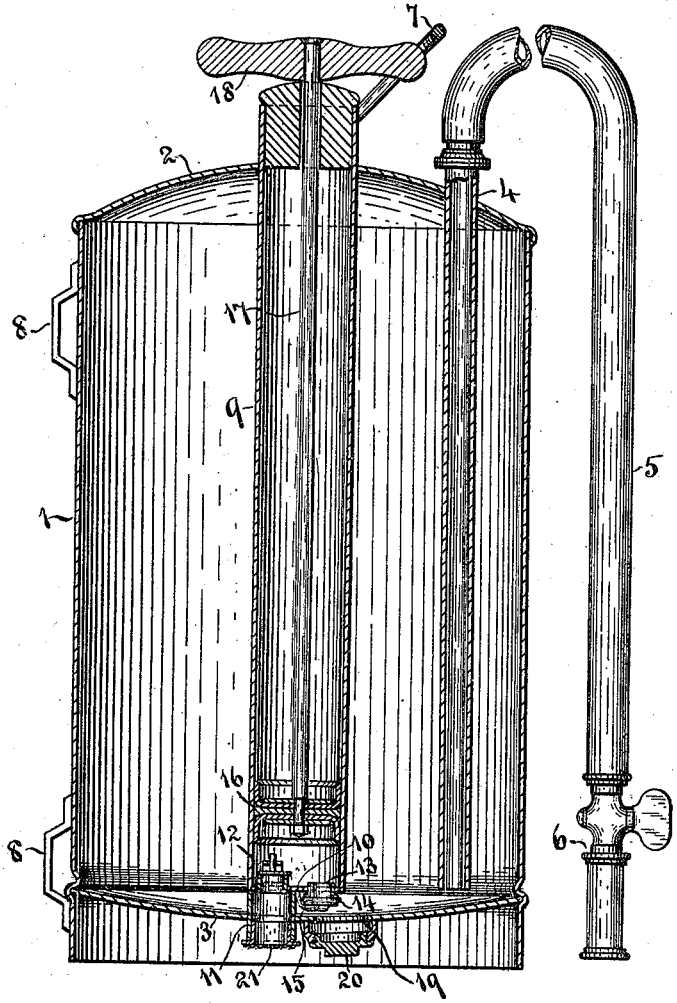

MOTT BILLINGS BROOKS, OF ROCHESTER, NEW YORK, ASSIGNOR TO FIELD FORCE PUMP COMPANY, OF ELMIRA, NEW YORK.

SPRAYING APPARATUS.

974,640.  Specification of Letters Patent.  Patented Nov. 1, 1910.

Application filed August 5, 1908. Serial No. 447,069.

*To all whom it may concern:*

Be it known that I, MOTT BILLINGS BROOKS, a citizen of the United States, residing at Rochester, in the county of Monroe and State of New York, have invented certain new and useful Improvements in Spraying Apparatus, of which the following is a specification.

This invention relates to improvements in spraying apparatus wherein the spraying fluid is contained within a tank or other receptacle under air pressure supplied to the receptacle by means of an air pump located therein. A spraying apparatus of this character has already been patented by me under Letters-Patent No. 669,819, dated March 12, 1901; and my present object is to simplify the apparatus and to provide a construction whereby the apparatus will possess increased strength and durability, and wherein the liability to leakage will be practically eliminated.

I attain my object by constructing the apparatus in the manner illustrated in the accompanying drawing which represents a vertical section through a spraying apparatus embodying my improvements.

The apparatus comprises a tank or other suitable receptacle 1, preferably of cylindrical form, closed at the top and bottom by the heads 2 and 3 rigidly fastened to the shell with liquid and air tight joints. The receptacle is provided with the usual discharge tube 4, extending from the top of the tank to near the bottom thereof, and provided with a rubber hose 5, having a suitable shut-off nozzle 6. The receptacle may be provided with a bail 7, for convenience in carrying it, or it may be provided with loops 8, for attaching a strap thereto for supporting it upon the body, in the usual manner.

Extending centrally from bottom to top of the receptacle is an air pump cylinder 9, which extends through the head 2, and is soldered or brazed thereto. At its lower extremity the cylinder 9 is provided with a head 10, positioned at a short distance above the bottom head 3 of the receptacle; and projecting from this cylinder head, at one side, is a tubular extension 11, of smaller diameter, which passes through the head 3, and is brazed or soldered thereto; thereby rigidly connecting the heads 2 and 3 together at the center, and causing the cylinder to act as a central stay or brace between the heads. An inwardly opening valve 12 is positioned in the cylinder over the opening into the extension 11; and at 13 the cylinder head is provided with a discharge orifice closed by a downwardly opening valve 14, which is held normally closed by a spring arm 15, fastened to the outer side of the cylinder head. Within the cylinder is a piston 16, of any suitable construction, operated by the piston rod 17, which passes out through the top of the cylinder, and is there provided with a suitable operating handle 18. The bottom head 3 of the receptacle is provided at 19 with an opening which is closed by a suitable screw cap or plug 20. This opening is located preferably directly below the valve 14, so that access may be had to said valve for cleaning and repairs. The opening is also used for filling the receptacle with the spraying liquid; and for draining out any sediment that may collect in the bottom and around the valve.

When filling the receptacle it will, of course, be understood that the receptacle will be turned upside down.

The tubular extension, or air inlet 11 is preferably provided across its mouth with a protective cap of wire mesh, as indicated at 21; and it will be noted that the rim of the shell of the receptacle is carried beyond the lower head 3, so as to project beyond the inlet and the filler plug; thereby protecting these exposed parts when the receptacle is resting upon the ground.

As so constructed the receptacle, and particularly the air pump parts, will be rendered simple and strong in construction, and the air, when the pump is operated, is delivered directly into the lower portion of the receptacle, through the discharge opening 13, instead of into a separate chamber, as in my former Letters Patent, heretofore mentioned. Access to the working parts is easily had through the filler opening 19, and the tubular extension 11.

I am aware that changes in the form and proportions of the parts and in the details of construction of the device, herein shown and described as the preferred embodiment of my invention, may be made by a skilled mechanic without departing from the spirit or sacrificing the advantages of my invention. I therefore reserve the right to make such modifications and alterations as fairly fall within the scope of my invention.

What I claim and desire to secure by Letters Patent is—

1. A spraying apparatus comprising a receptacle, a cylinder extending through the receptacle from the top to near the bottom thereof, a head closing the lower end of the cylinder, a tubular extension of smaller diameter leading from the head through the bottom of the receptacle, an induction valve for said tube, an eduction valve at the lower end of the cylinder, and a piston and operating rod in the cylinder.

2. A spraying apparatus comprising a receptacle, a cylinder extending through the receptacle from the top to near the bottom thereof, a head closing the lower end of the cylinder, a tubular extension of smaller diameter leading from one side of the head to and through the bottom of the receptacle, an induction valve for said tube, an eduction passage through the head, a downwardly opening valve for said passage, and a piston and operating rod in the cylinder.

In testimony whereof I have affixed my signature, in presence of two witnesses.

MOTT BILLINGS BROOKS.

Witnesses:
JAMES H. PERRY,
MINNIE H. PERRY.